United States Patent
Kim

(10) Patent No.: US 7,477,889 B2
(45) Date of Patent: Jan. 13, 2009

(54) MESSAGE AUTHENTICATION APPARATUS AND METHOD IN MOBILE COMMUNICATION SYSTEM

(75) Inventor: Jong-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 11/043,961

(22) Filed: Jan. 28, 2005

(65) Prior Publication Data

US 2005/0170812 A1    Aug. 4, 2005

(30) Foreign Application Priority Data

Jan. 31, 2004    (KR)    .................. 10-2004-0006444

(51) Int. Cl.
*H04Q 7/20*    (2006.01)
(52) U.S. Cl. ..................... 455/411; 455/412.1
(58) Field of Classification Search ............... 455/410, 455/411, 412.1, 412.2, 414.1, 414.2, 414.3, 455/415, 422.1
See application file for complete search history.

(56) References Cited

U.S. PATENT DOCUMENTS

| | | | |
|---|---|---|---|
| 5,884,159 A * | 3/1999 | Thro et al. ............... | 455/412.1 |
| 6,597,917 B1 | 7/2003 | Meuronen | |
| 7,069,301 B2 | 6/2006 | Jerbi et al. | |
| 2003/0129964 A1 * | 7/2003 | Kohinata et al. ........... | 455/411 |
| 2003/0228883 A1 * | 12/2003 | Kusakari et al. ......... | 455/550.1 |
| 2004/0001455 A1 | 1/2004 | Matto et al. | |
| 2004/0048605 A1 * | 3/2004 | Schaefer et al. .......... | 455/414.2 |
| 2005/0136892 A1 * | 6/2005 | Oesterling et al. ......... | 455/411 |

FOREIGN PATENT DOCUMENTS

| | | |
|---|---|---|
| CN | 1419790 A | 5/2003 |
| GB | 2 380 897 A | 4/2002 |
| JP | 08-265843 | 10/1996 |
| JP | 2002-510179 | 4/2002 |
| JP | 2004-518385 | 6/2004 |
| KR | 2003-0086548 | 11/2003 |
| WO | WO-01/49054 A1 | 7/2001 |

* cited by examiner

*Primary Examiner*—Sam Bhattacharya
(74) *Attorney, Agent, or Firm*—Birch, Stewart, Kolasch & Birch, LLP

(57) ABSTRACT

A message authentication apparatus in a mobile communication system includes a server for detecting recipient identification, an originator phone number, origination type information and a security code along with a received message. The server outputs authentication state information concerning an originator of the message on the basis of the detected originator phone number and security code. A mobile switching center establishes a transmission path for the message on the basis of the detected recipient identification and transmits the message, the detected originator phone number, the origination type information and the authentication state information to the recipient.

35 Claims, 5 Drawing Sheets

US 7,477,889 B2

MESSAGE AUTHENTICATION APPARATUS AND METHOD IN MOBILE COMMUNICATION SYSTEM

This application claims the priority benefit of Patent Application No. 10-2004-0006444 filed on Jan. 31, 2004 in Republic of Korea, which is hereby incorporated by reference.

This application is related to Applicant's copending application, Ser. No. 11/043,160, filed on the same date as this application, entitled "Apparatus and Method for Checking Originator Information of Message in Mobile Communication System," which is incorporated by reference herein.

BACKGROUND OF THE INVENTION

1. Field of the Invention

The present invention relates to a mobile communication system. More particularly, the present invention relates to a message authentication apparatus and method of a mobile communication system.

2. Description of the Related Art

In general, a mobile communication system allows a user to wirelessly page and be wirelessly connected for communication with another party instantly, any time and anywhere through switch controlling of an Mobile Switching Center (MSC), while the user moves in a service area served by a base station (BS).

Presently, data communication (e.g. text messaging) and multimedia communication (e.g. video clips, still pictures), as well as voice communication can occur between the user and another party.

A mobile station (MS) used for mobile communication is usually in a standby mode most of the time. In other words, the voice communication usage time or operation rate of the MS is low. Thus, in order to raise the operation rate of the MS, mobile communication service providers have developed and provided supplementary services including online games, wireless Internet connection, text message transmission and image message transmission services. In addition, the MS can perform various other functions and operations, such as phone book management, memorandum creation, message creation, schedule management, games, camera functions, electronic calculator and time alarms.

The text message transmission function, the most frequently used supplementary service, transfers a message with desired content to another party simply and accurately by using symbols, numbers, characters, figures and the like. The text message transmission function has an advantage that it occupies a transmission channel for a very short time, so a communication cost is low. Also, since a text message uses a non-real time transmission method, desired content can be accurately transferred regardless of an off-hook status of the other party.

There are many ways to send a text message such as by connecting a text terminal to a general wired phone set, connecting a computer to the Internet, and creating a text message in a mobile communication terminal (such as a cellular phone, PDA etc.). In these methods, a specific phone number of a user or an arbitrary phone number is inputted as originator information and then transmitted together with the corresponding text message. Then, an MS of a receiving side can check the received text message and the originator information.

The method for checking originator information of a message (message sender information) in a mobile communication system for a text message transmission service in accordance with the related art will now be described with reference to FIG. 1.

FIG. 1 is a flow chart of a message authentication method in a mobile communication system in accordance with the related art.

As shown in FIG. 1, the related art method for checking originator information of a message in a mobile communication system includes: a step in which whether a text message has been inputted is checked (step S11); a step in which when a text message has been inputted, a originator phone number of the inputted text message and recipient identification are detected (step S12); a step in which a transmission path of the text message is set based on the recipient identification (step S13); a step in which the text message and the detected originator phone number are transmitted through the set transmission path (step S14); and a step in which the transmitted text message and the originator phone number are displayed (step S15).

The related art method for checking originator information of a message in a mobile communication system will be described in detail as follows. First, a user creates a text message of desired content through a text message origination function of the MS. The user inputs originator information (e.g., the originator phone number), and then, transmits the text message having the originator information to a base station (BS) of a service area where the user belongs. In this case, the BS forms a specific service area for transmitting/receiving a communication signal by being wirelessly connected with the MS. A wider service area can be formed by disposing multiple BSs at certain intervals.

The BS transmits the received text message to the MSC. Then, a server checks whether the text message has been inputted to the MSC (step S11). When the text message has been inputted, the server detects the originator information and the recipient identification of the text message (step S12). Then, the server transmits the detected information to the MSC, and the MSC establishes a transmission path for the text message, based on the detected recipient identification (step S13).

Thereafter, the MSC transmits the text message and the detected originator information through the established transmission path to a BS where the MS of the recipient resides (step S14). The MS of the receiving side displays the text message and the originator information of the text message through a display unit (step S15).

The step of displaying the text message and the originator information of a text message will now be described with reference to FIG. 2. FIG. 2 is a flow chart of a message authentication method at an MS of a receiving side, in accordance with the related art.

As shown in FIG. 2, the related art method for checking originator information of a message by an MS at a receiving side, includes: a step in which whether a text message has been received is checked (step S21); a step in which when a text message has been received, the text message is detected (step S22); a step in which a originator phone number of the detected text message is detected (step S23); and a step in which the detected text message and the originator phone number are displayed (step S24).

The related art method for checking originator information of a message of the MS of the receiving side will now be described in detail. First, a BS of the receiving side on the transmission path transmits the text message and the originator phone number of the text message to the MS of the receiving side. The MS of the receiving side periodically checks whether the message transmitted from the BS of the corresponding service area is inputted (step S21).

When the message is inputted, the MS of the receiving side detects the message (step S22), detects the originator phone number of the message (step S23), and displays the detected message and the detected originator phone number through a display unit, so that the receiving side can check the text message and the originator phone number of the text message (step S24).

As mentioned above, thanks to the development of various communication-related techniques, mass production and the drop in the cost of parts, the text message transmission method of the mobile communication system of the related art can transfer desired content accurately on a real time basis at a relatively low cost. However, the related art method for checking the originator information in a mobile communication system has drawbacks. Since only the originator phone number, inputted by a user, is set as originator information and transmitted together with a corresponding text message, the receiving MS cannot properly check the truth of the origination information of the received text message. In other words, the originator or sender of the text message may have supplied a false originator phone number to trick or mislead the recipient as to the source of the text, image or video message.

SUMMARY OF THE INVENTION

Therefore, one object of the present invention is to provide a message authentication apparatus and method in a mobile communication system capable of enhancing a reliability of originator information of a received message. In accordance with the present invention, a security code inputted by a user is compared with a pre-set security code stored at or access by the MSC. The MSC transmits authentication state information of a message originator according to the comparison result.

To achieve these and other advantages in accordance with the present invention, there is provided a message authentication apparatus in a mobile communication system including: a server for detecting recipient identification, an originator phone number, origination type information and a originator security code of a received message and formulating authentication state information of an originator on the basis of the detected originator phone number and originator security code. A mobile switching center (MSC) establishes a transmission path for the message on the basis of the detected recipient identification, and transmits the message, the detected originator phone number, the origination type information and authentication state information through the transmission path to the recipient.

To achieve the above object, there is also provided a message authentication method in a mobile communication system including: detecting recipient identification, an originator phone number, origination type information and a originator security code of a received message, and formulating authentication state information of an originator on the basis of the detected originator phone number and originator security code. The MSC establishes a transmission path for the message on the basis of the detected recipient identification, and transmits the received message, the detected originator phone number, the origination type information and the authentication state information of the originator to the recipient.

To achieve the above object, there is also provided a message authentication method in a mobile communication system including: requesting a security code from the originator according to a request for authentication by a recipient; waiting to receive the security code; formulating authentication state information on the basis of any received security code and originator phone number; and transmitting the formulated authentication state information to the recipient.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A message authentication apparatus and method in a mobile communication system is capable of enhancing reliability of originator information of a received message by comparing a security code inputted by a user with a pre-set security code. The message authentication apparatus and method formulates and transmits authentication state information of a message originator according to the comparison result. The apparatus and method, in accordance with an embodiment of the present invention, will now be described with reference to the accompanying drawings.

The message authentication apparatus and method in a mobile communication system, in accordance with the present invention, can be applied to any mobile communication system, as long as the system provides a Short Message Service (SMS), a Long Message Service (LMS) or a Multimedia Message Service (MMS).

Figure 1:
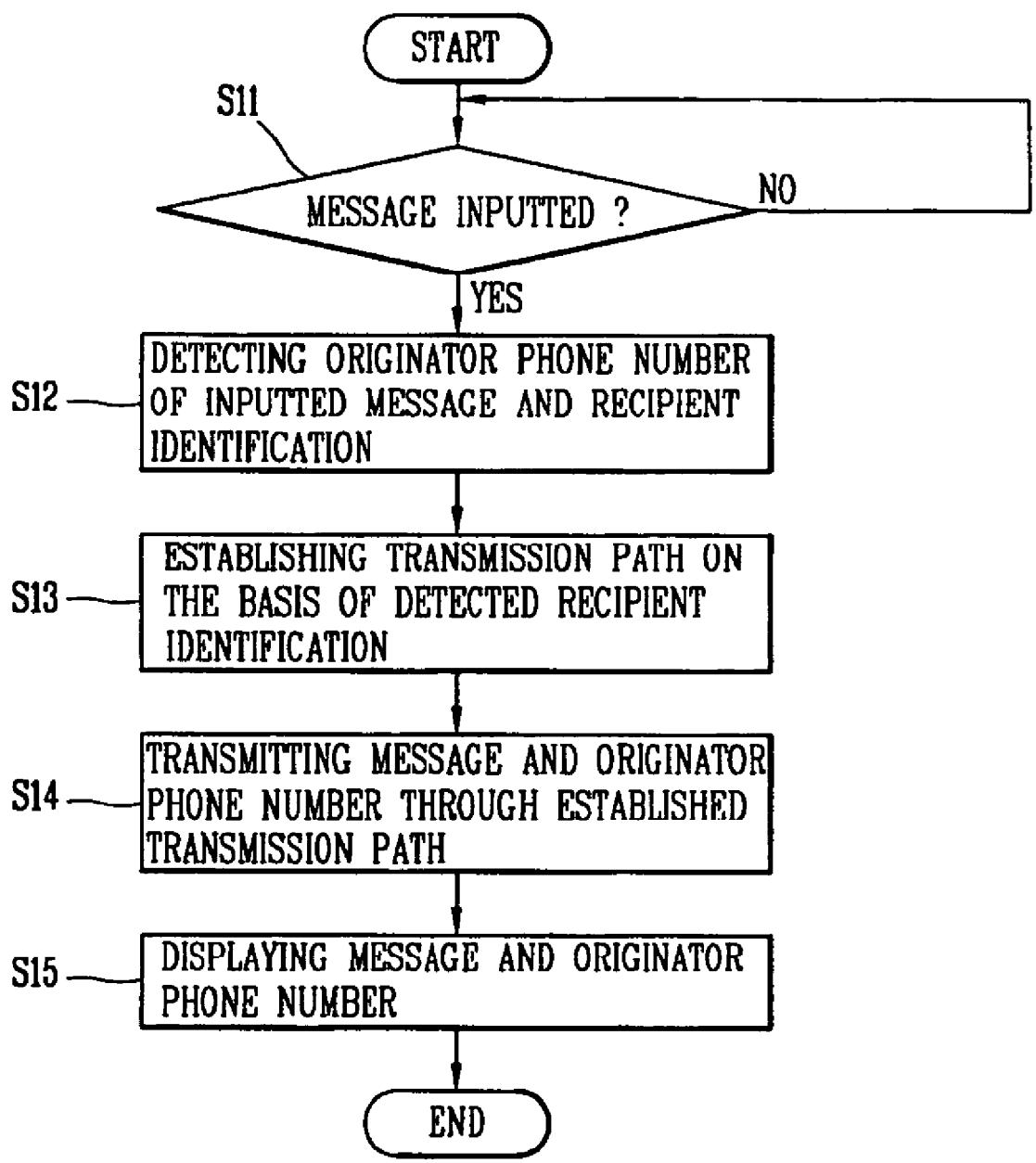
FIG. 1 is a flow chart of a message authentication method in a mobile communication system, in accordance with the related art.
Figure 2:
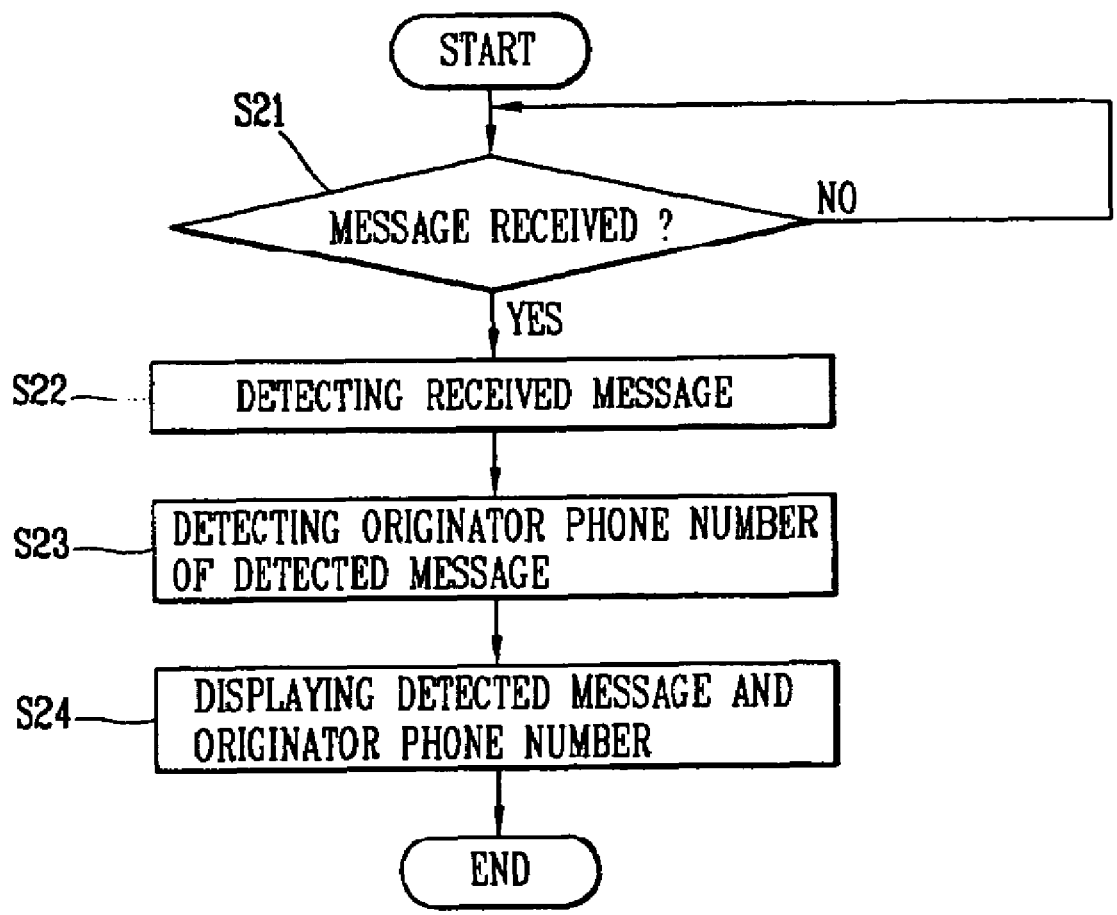
FIG. 2 is a flow chart of a message authentication method of an MS of a receiving side, in accordance with the related art.
Figure 3:
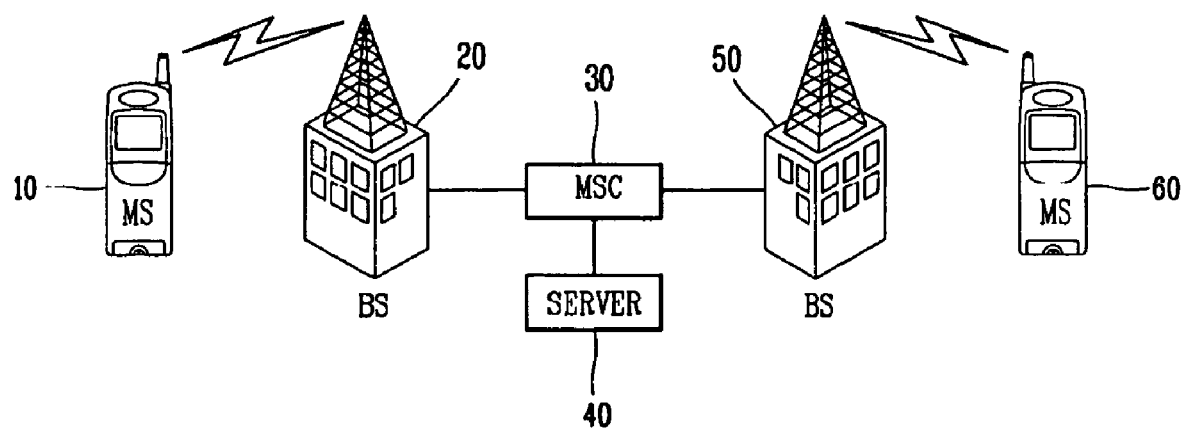
FIG. 3 shows the construction of a message authentication apparatus in a mobile communication system, in accordance with the present invention.

FIG. 3 shows the construction of a message authentication apparatus in a mobile communication system, in accordance with the present invention.

As shown in FIG. 3, the message authentication apparatus in a mobile communication system, in accordance with the present invention, includes: a transmitting side mobile station (MS) 10 for originating a message inputted by a user and a security code of the message. A base station (BS) 20 receives the originated message and the security code and transmits them. A server 40 detects recipient identification of the transmitted message, an originator phone number, origination type information and the security code, and formulates and outputs authentication state information of the originator on the basis of the detected originator phone number and security code. A Mobile Switching Center (MSC) 30 establishes a transmission path for the message according to the detected recipient identification. The MSC 30 transmits the detected originator phone number, the origination type information and the authentication state information through the established transmission path. A receiving side Base Station (BS) 50 outputs the message, the originator phone number, the origination type information and the authentication state information to a receiving side service area. A receiving side or recipient mobile station (MS) 60 displays the message, the originator phone number, the origination type information and the authentication state information on a display unit, such as an LCD portion of a cell phone. The server 40 includes a database storing the phone number of the user registered in the mobile communication system and a pre-set security code corresponding to the phone number.

Figure 4:
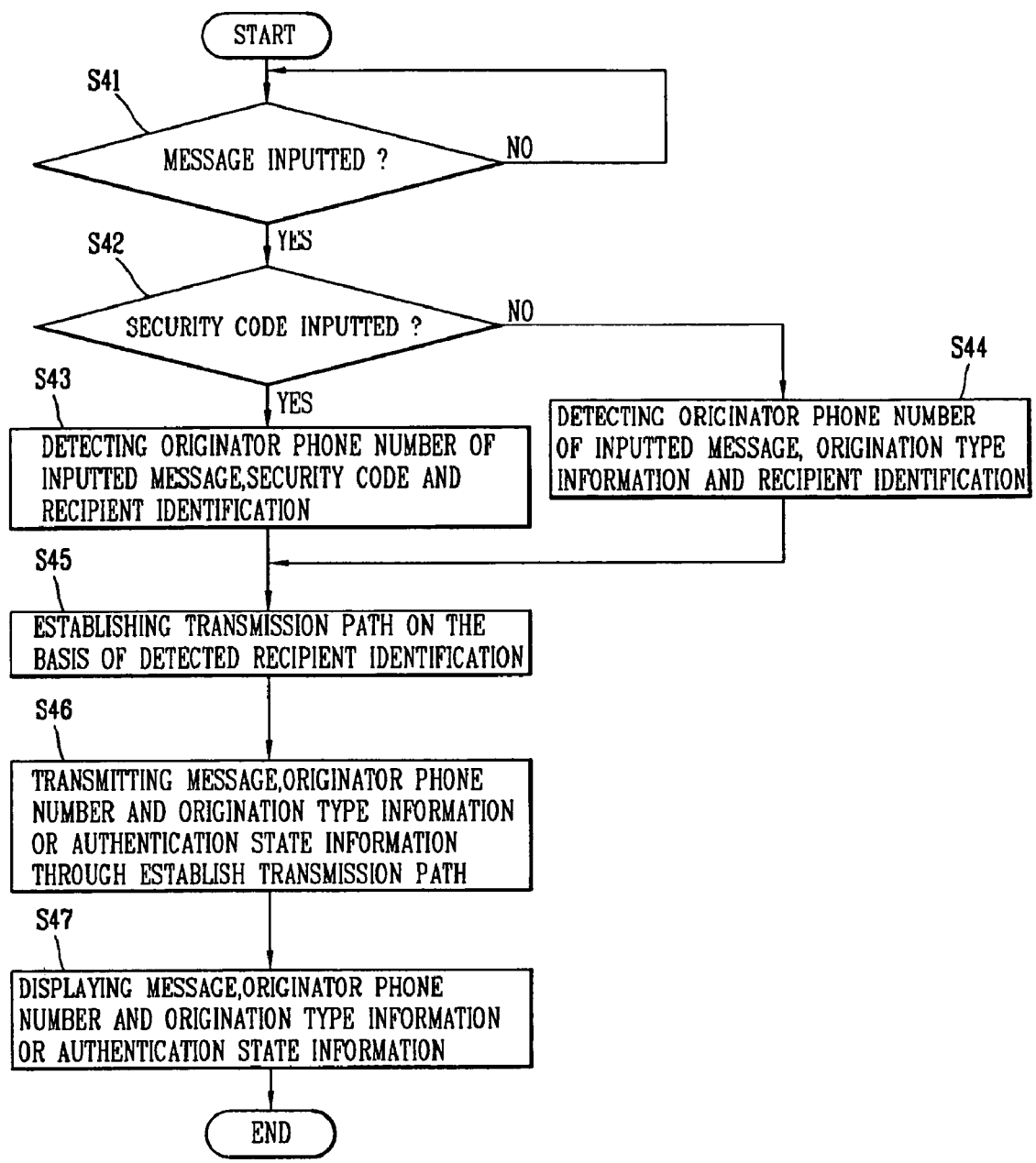
FIG. 4 is a flow chart of an originated message authentication method in the mobile communication system, in accordance with the present invention.

The originated message authentication method in the mobile communication system, in accordance with the present invention, will now be described with reference to the flow chart of FIG. 4. As shown in FIG. 4, the originated message authentication method in the mobile communication system includes a step in which it is checked whether a message is inputted (step S41). If so, there is a step in which it is determined whether a security code of the inputted message is inputted (step S42). When the security code is inputted, recipient identification of the inputted message, an originator phone number and the security code are detected (step S43). The security code and originator phone number are used during a comparison step in the MSC 30 to formulate authentication state information, which will be more fully explained later. Next, a transmission path of the message is established on the basis of the detected recipient identification (step S45). Next, in step S46, the message, the originator phone number, and the authentication information are transmitted to a receiving side through the established transmission path. Finally, in step S47, the message, the originator phone number and the authentication state information are displayed.

In the determining step (step S42), when no security code is inputted, recipient identification of the inputted message, the originator phone number and origination type information are detected (step S44). Then, the process proceeds to step S45. The originated message authentication method in the mobile communication system will now be described in greater detail. First, the user creates a message through an originating or transmitting side MS 10 that is able to transmit/receive a message, and manually inputs a security code for authentication of the source of the message. Alternatively, the transmitting MS 10 could have the security code stored therein and automatically append the security code to the message, such that a user need not manually input the security code with each message. Then, the transmitting side MS 10 associates the inputted security code together with the created message and sends both to the transmitting side BS 20. The transmitting side MS 10, supporting the wireless transmission/reception function of messages, is capable of data communication with symbols, numbers and characters and multimedia communication including images and/or video clips.

The MSC 30 receives the message from the transmitting side BS 20 and transmits the received message to the receiving side BS 50, wherein the receiving side MS 60 is within the service area of the receiving side BS 50. The receiving side MS 60 is identified by the recipient identification. The server 40 checks the message received by the MSC 30 (step S41), and determines whether a security code exists in the received message (step S42). When the security code exists, the server 40 detects the recipient identification of the received message and, the originator phone number, and formulates authentication state information, and transmits them as origination information to the MSC 30 (step S43). In formulating the authentication state information, the server 40 determines whether the detected security code is identical on to a pre-set security code corresponding to the phone number, where the pre-set security codes and corresponding phone numbers are stored in a database accessible by the server 40. The server 40 formulates the authentication state information according to the comparison between the detected security code and the stored pre-set security code corresponding to the originator's phone number.

The authentication state information can be set as shown in Table 1.

TABLE 1

| Display state | Authentication state information |
| --- | --- |
| OK | When the originator has a proper security code |
| NO | When the originator has an improper security code |

As shown in Table 1, in the display state, 'OK' signifies that the originator has a proper security code and 'NO' signifies that the originator does not have a proper security code. The authentication state information of the originated message is displayed on a display of the receiving side MS 60.

When no security code is inputted, the server detects the recipient identification of the message, the originator phone number and the origination type information and transmits them along with the message to the MSC 30 (step S44). The origination type information signifies a type of an originating device that created and/or transmitted the message. The originating device can be an MS wirelessly connected to the MSC through a public network, or a fixed line phone or a computer connected to the MSC. On the display of the receiving side MS 60, 'M' could signify mobile, 'I' could signify Internet and 'T' could signify telephone. The origination type information can be set as shown in Table 2.

TABLE 2

| Display state | Origination type information |
| --- | --- |
| M | Mobile communication terminal |
| I | Internet computer |
| T | Fixed line telephone |

The BSs 20 and 50 form a service area in which they can be wirelessly connected to the MSs 10 and 60 for communication. The BS 20 and 50 are operated under the control of the MSC 30. The MSC 30 controls or monitors a general operation of the mobile communication system, analyzes and switches a call connection request signal, and establishes a corresponding transmission path on the basis of the recipient identification of the message (step S45). The transmission path includes a voice channel for transmitting a voice signal, a data channel for transmitting a data signal and a channel for transmitting operation information.

The receiving side BS 50 on the established transmission path outputs the message and the origination information received from the MSC 30 to the receiving side MS 60 positioned in its service area (step S46). The receiving side MS 60 displays the received message and the origination information on its display unit (step S47).

In other words, when the security code is inputted, the receiving side MS 60 displays the message and the originator phone number and the authentication state information as origination information. When no security code is inputted, the receiving side MS 60 displays the message and the originator phone number and the origination type information as origination information.

Figure 5:
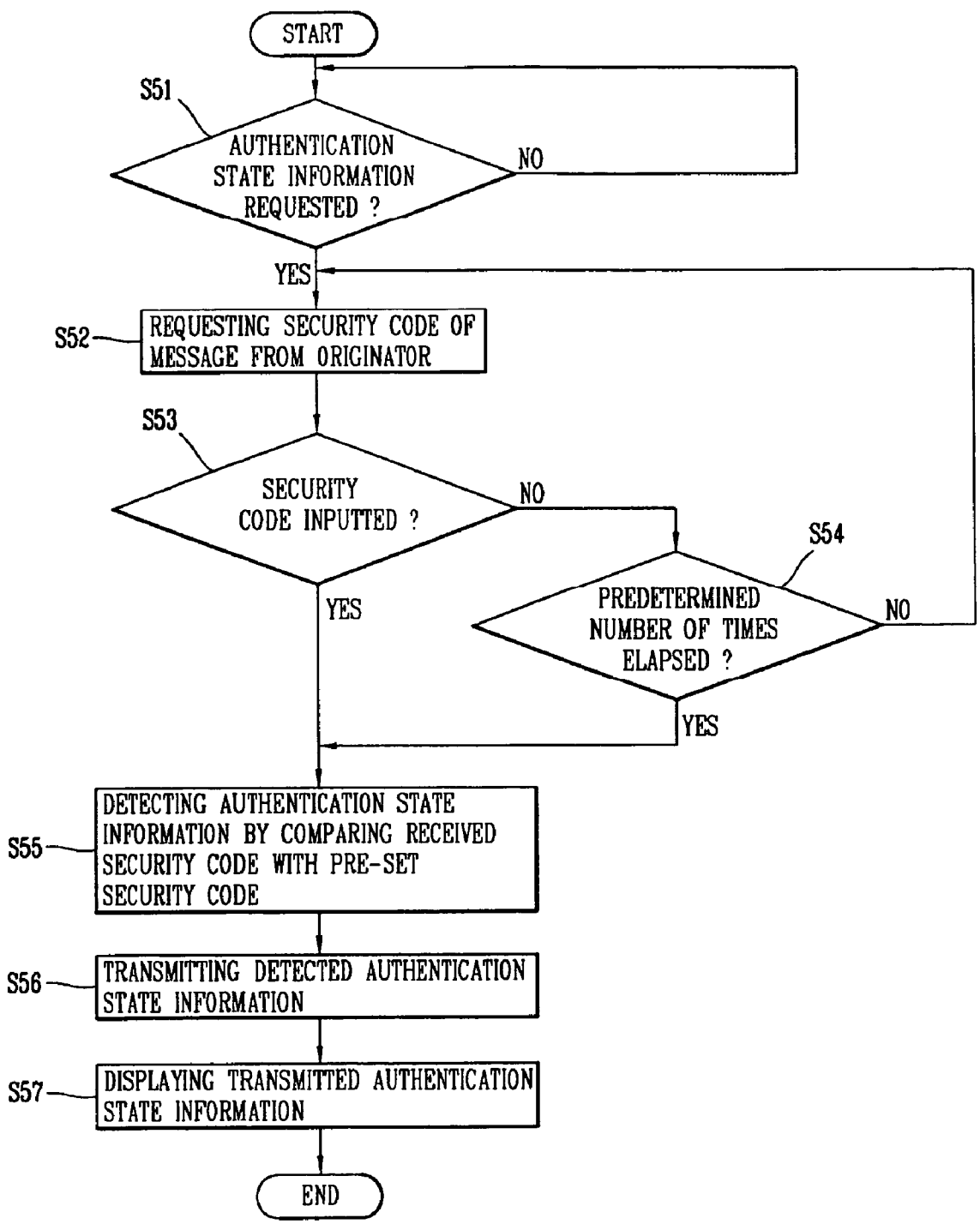
FIG. 5 is a flow chart of a reception message authentication method in the mobile communication system, in accordance with the present invention.

A reception message authentication method in the mobile communication system in the event that a message is received without the authentication state information in accordance with the present invention, will now be described with reference to FIG. 5. FIG. 5 is a flow chart of a reception message authentication method in the mobile communication system, in accordance with the present invention.

As shown in FIG. 5, the reception message authentication method in the mobile communication system starts with a step in which it is checked whether authentication state information for a message has been requested by a user of the receiving side MS 60 (step S51). If so, the receiving side MS 60 requests a security code for the received message (step S52). Next, it is determined whether the requested security code was inputted by the originator (step S53). When a security code was inputted, the inputted security code is compared with a pre-set security code associated with the originator's phone number and corresponding authentication state information is formulated according to the comparison result (step S55). The formulated authentication state information is transmitted to the receiving side MS 60 (step S56). Finally, the authentication state information is displayed on a display of the receiving side MS 60 (step S57).

If no security code was inputted in step S53, the security code is requested again up to a pre-set number of times (step S54).

The reception message authentication method in the mobile communication system in accordance with the present invention will now be described in detail. First, when the receiving side MS 60 receives a message without authentication state information, the receiving side MS 60 displays the received message and an originator phone number and origination type information as origination information. When a user of the receiving side MS 60 desires to check authentication state information of the received message, he/she can request authentication state information for the received message from the server 40. The server 40 checks whether the authentication state information of the message has been requested (step S51). When the authentication state information of the message is requested by the recipient, the server 40 requests a security code from the originator at periodic intervals up to a pre-set number of times, or until the security code is received. Specifically, the server 40 checks whether the requested security code is inputted (step S53), and when the security code is inputted, the server 40 compares the inputted security code with a security code stored in the database at the server or at a remote location, such as a cellular service provider's web site. Next, the server 40 formulates corresponding authentication state information according to the comparison result.

When the inputted security code is identical to, or corresponds to, the stored security code, the server 40 outputs authentication state information indicating that the originator has a proper security code. When the inputted security code is not corresponding or identical to the stored security code, the server 40 outputs authentication state information indicating that the originator does not have a proper security code.

Meanwhile, when no security code is inputted, the server 40 checks whether the number of requests for the security code exceeds a pre-set number of requests (step S54). When the number of requests for the security code exceeds the pre-set number of requests, the server 40 formulates and outputs authentication state information indicating that no security code has been received (step S55). When the number of requests for the security code does not exceed the pre-set number of requests, the server 40 again requests the security code of the message (step S52). For example, the server 40 could request the security code from the transmitting MS 10 three times or more at predetermined time intervals, such as every ten or twenty seconds.

The displayed authentication state information can be set as shown in Table 3.

TABLE 3

| Display state | Authentication state information |
| --- | --- |
| OK | Originator has proper security code |
| NO | Originator has improper security code |
| NA | Security code has not been received from originator |

As shown in Table 3, in the display state, 'OK' signifies that the originator has a proper security code, 'NO' signifies that the originator has an improper security code, and 'NA': signifies that a security code has not been received from the originator. Thereafter, the server 40 transmits the formulated authentication state information to the receiving side MS 60 (step S56). Then, the receiving side MS 60 displays the received authentication state information on the display unit of the receiving side MS 60 (step S57).

As so far described, the message authentication apparatus and method in a mobile communication system, in accordance with the present invention, has several advantages. For example, since a security code inputted by a user is compared with a pre-set security code and authentication state information of an originator is transmitted according to the comparison result, the reliability of originator information of a received message is enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A message authentication apparatus in a mobile communication system comprising:

a server for receiving a message from an end user of an originator terminal for transmission to an end user of a recipient terminal, said server detecting information associated with the message, the information including a recipient identification, an originator phone number and an originator security code, said server formulating authentication state information concerning the originator terminal on the basis of the detected originator phone number and originator security code; and a mobile switching center (MSC) for transmitting the received message and authentication state information to the recipient terminal, wherein the authentication state information is one of information indicating that a proper security code has been received from the originator terminal, information indicating that an improper code has been received from the originator terminal, and information indicating that a security code has not been received from the originator terminal, and wherein the recipient terminal displays the authentication state information to the end user of the recipient terminal without automatically disabling a communication from the originator terminal such that the end user of the recipient terminal can readily determine if the originator terminal has a proper security code and thereby determine reliability of information about the originator terminal.

2. The apparatus according to claim 1, wherein the MSC also establishes a transmission path for the message on the basis of the detected recipient identification.

3. The apparatus according to claim 1, wherein the MSC also transmits the detected originator phone number along with the received message and authentication state information to the recipient terminal.

4. The apparatus according to claim 1, wherein the message is sent as part of a short message service (SMS), a long message service (LMS) or a multimedia message service (MMS) of the mobile communication system.

5. The apparatus according to claim 1, wherein the security code is a pre-set or user-selected code which has been associated to the originator phone number and registered in the mobile communication system.

6. The apparatus according to claim 1, wherein the information associated with the message also includes an identification of a type of source used by the end user of the originator terminal in sending the message, and wherein said transmitting step also includes transmitting the identification of the type of source to the recipient terminal.

7. The apparatus according to claim 6, wherein the identification of the type of source indicates a mobile station (MS), a computer or a fixed line phone.

8. A message authentication apparatus in a mobile communication system comprising:

a server for receiving a message from an end user of an originator terminal for transmission to an end user of a recipient terminal, said server detecting information associated with the message, the information including a recipient identification; and a mobile switching center (MSC) for transmitting the received message to the recipient terminal, wherein said server is adapted to receive a request from the end user of the recipient terminal for an authentication of the message, in response, said server requesting a security code from the end user of the originator terminal that created the message, wherein said server waits to receive a security code from the originator terminal, formulates authentication state information on the basis of the received security code and a phone number of the originator terminal, transmits the formulated authentication state information to the recipient terminal, and displays the authentication state information to the end user of the recipient terminal without automatically disabling a communication from the originator terminal such that the end user of the recipient terminal can readily determine if the end user of the originator terminal has entered a proper security code and thereby determine reliability of information about the originator terminal.

9. The apparatus according to claim 8, wherein if no security code is received, said server repeats the request up to a predetermined number of times.

10. The apparatus according to claim 9, wherein after said server repeats the request the predetermined number of times and no security code has been received, said server ceases to repeat the request and formulates authentication state information indicating that no security code was received.

11. The apparatus according to claim 10, wherein the predetermined number of times is three times or more.

12. The apparatus according to claim 8, wherein the security code is a pre-set or user-selected code which has been associated to a phone number of the originator terminal and registered in said mobile communication system.

13. The apparatus according to claim 12, wherein the security code is manually entered by the end user of the originator terminal in response to a request for the security code.

14. The apparatus according to claim 12, wherein the security code and phone number of the originator are manually entered by the end user of the originator terminal.

15. The apparatus according to claim 12, wherein the authentication state information is one of information indicating that a proper security code has been received from the end user of the originator terminal, information indicating that an improper code has been received from the end user of the originator terminal, and information indicating that a security code has not been received from the end user of the originator terminal.

16. The apparatus according to claim 8, wherein said server repeats the request for the security code at pre-set time intervals, if no security code is received.

17. A message authentication apparatus in a mobile communication system comprising:

a server for receiving a message from an end user of an originator terminal for transmission to an end user of a recipient terminal, said server detecting information associated with the message, the information including a recipient identification, an originator phone number and an originator security code, said server formulating authentication state information concerning the originator terminal on the basis of the detected originator phone number and originator security code;

a mobile switching center (MSC) for transmitting the received message and authentication state information to the recipient terminal, wherein the recipient terminal receives the message and authentication state information transmitted by the MSC, and displays the received message and authentication state information on a display unit of the recipient terminal without automatically disabling a communication from the originator terminal such that the end user of the recipient terminal can readily determine if the end user of the originator terminal has entered a proper security code and thereby determine reliability of information about the originator terminal, and wherein the authentication state information is one of information indicating that a proper security code has been received from the originator terminal, information indicating that an improper code has been received from the originator terminal, and information indicating that a security code has not been received from the originator terminal.

18. The method according to claim 17, wherein the security code of the originator terminal is manually entered by the end user of the originator terminal into a source device used by the end user of the originator terminal in sending the message, prior to sending the message.

19. A message authentication method in a mobile communication system comprising:

receiving a message from an end user of an originator terminal for transmission to an end user of a recipient terminal;

detecting information associated with the message, the information including a recipient identification, an originator phone number and an originator security code;

formulating authentication state information concerning the end user of the originator terminal on the basis of the detected originator phone number and originator security code; and transmitting the received message and the authentication state information to the recipient terminal, wherein the authentication state information is one of information indicating that a proper security code has been received from the originator terminal, information indicating that an improper code has been received from the originator terminal, and information indicating that a security code has not been received from the originator terminal, and wherein the recipient terminal displays the authentication state information to the end user of the recipient terminal without automatically disabling a communication from the originator terminal such that the end user of the recipient terminal can readily determine if the originator terminal has a proper security code and thereby determine reliability of information about the originator terminal.

20. The method according to claim 19, wherein said transmitting step also includes transmitting the detected originator phone number along with the received message and the authentication state information to the recipient terminal.

21. The method according to claim 19, further comprising establishing a transmission path for the message on the basis of the detected recipient identification, prior to said transmitting step.

22. The method according to claim 19, wherein the message is sent as part of a short message service (SMS), a long message service (LMS) or a multimedia message service (MMS) of the mobile communication system.

23. The method according to claim 19, wherein the security code is a pre-set or user-selected code which has been associated to the originator phone number and registered in the mobile communication system.

24. The method according to claim 19, wherein the information associated with the message also includes an identification of a type of source used by the end user of the originator terminal in sending the message, and wherein said transmitting step also includes transmitting the identification of the type of source to the recipient terminal.

25. The method according to claim 24, wherein the identification of the type of source indicates a mobile station (MS), a computer or a fixed line phone.

26. The method according to claim 19, wherein the security code of the originator terminal is manually entered by the end user of the originator terminal into a source device used by the end user of the originator terminal in sending the message, prior to sending the message.

27. A message authentication method in a mobile communication system comprising:

transmitting a message to an end user of a recipient terminal;

receiving a request from the end user of the recipient terminal for an authentication of the message;

requesting a security code from an end user of an originator terminal who created the message;

waiting to receive a security code from the end user of the originator terminal;

formulating authentication state information on the basis of the received security code and a phone number of the originator terminal; and transmitting and displaying the formulated authentication state information to the end user of the recipient terminal without automatically disabling a communication from the originator terminal such that the end user of the recipient terminal can readily determine if the end user of the originator terminal has entered a proper security code and thereby determine reliability of information about the originator terminal.

28. The method according to claim 27, wherein said requesting step is repeated at pre-set time intervals if no security code is received.

29. The method according to claim 27, wherein during said waiting step, if no security code is received, said requesting step is repeated up to a predetermined number of times.

30. The method according to claim 29, wherein after said requesting step has been repeated the predetermined number of times and no security code has been received, said waiting step ceases and said formulating step includes formulating authentication state information indicating that no security code was received.

31. The method according to claim 30, wherein the predetermined number of times is three times or more.

32. The method according to claim 27, wherein the security code is a pre-set or user-selected code which has been associated to a phone number of the originator terminal and registered in the mobile communication system.

33. The method according to claim 32, wherein the security code is manually entered by the end user of the originator terminal in response to a request for the security code.

34. The method according to claim 32, wherein the security code and phone number of the originator terminal are manually entered by the end user of the originator terminal.

35. The method according to claim 32, wherein the authentication state information is one of information indicating that a proper security code has been received from the end user of the originator terminal, information indicating that an improper code has been received from the end user of the originator terminal, and information indicating that a security code has not been received from the end user of the originator terminal.

* * * * *